United States Patent [19]
Deremo

[11] Patent Number: 5,374,143
[45] Date of Patent: Dec. 20, 1994

[54] AIR FEED PECK DRIVE CONFIGURATION

[75] Inventor: Edwin J. Deremo, Lexington, S.C.

[73] Assignee: Cooper Industries, Inc., Houston, Tex.

[21] Appl. No.: 150,547

[22] Filed: Nov. 9, 1993

Related U.S. Application Data

[63] Continuation of Ser. No. 873,639, Apr. 23, 1992, abandoned, which is a continuation of Ser. No. 114,954, Oct. 30, 1987, abandoned.

[51] Int. Cl.$^5$ .................. B23B 45/04; B23B 47/22
[52] U.S. Cl. ............................ 408/17; 408/111; 408/130
[58] Field of Search .............. 408/14, 16, 17, 110, 408/111, 112, 130, 241 B, 241 G, 241 S, 241 R; 409/218; 279/156

[56] References Cited

U.S. PATENT DOCUMENTS

| | | | |
|---|---|---|---|
| D. 139,795 | 12/1944 | Terry . | |
| D. 139,796 | 12/1944 | Terry | D54/4 |
| D. 201,153 | 5/1965 | Douglas | D54/14 |
| D. 309,616 | 7/1990 | Carter et al. | D15/138 |
| D. 315,279 | 3/1991 | Stewart et al. | D8/61 |
| D. 315,280 | 3/1991 | Stewart et al. | D8/61 |
| D. 316,508 | 4/1991 | Stewart et al. | D8/68 |
| 2,165,396 | 7/1939 | Mansfield | 10/135 |
| 2,578,454 | 12/1951 | Saives | 77/32.3 |
| 2,579,459 | 12/1951 | Allen | 77/32.3 |
| 2,601,434 | 6/1952 | Du Bois | 77/40 |
| 2,604,759 | 7/1952 | Smith | 408/14 X |
| 2,607,197 | 8/1952 | Johnson | 408/9 X |
| 2,625,844 | 1/1953 | Beckett et al. | 77/33.7 |
| 2,657,595 | 11/1953 | Shaff | 408/130 |
| 2,686,440 | 8/1954 | Van Cutsem | 77/55 |
| 2,791,922 | 5/1957 | Robinson | 77/34.4 |
| 2,852,965 | 9/1958 | Wallace | 77/32.3 |
| 2,854,871 | 10/1958 | Stratman | 173/157 |
| 2,857,789 | 10/1958 | Robinson | 408/11 |
| 2,860,531 | 11/1958 | DeGroff | 408/130 |
| 2,881,589 | 4/1959 | Hitt et al. | 408/130 X |
| 2,909,949 | 10/1959 | Winslow | 77/13 |
| 2,977,826 | 4/1961 | Radford | 77/32.3 |
| 3,004,271 | 10/1961 | Hayes | 10/129 |
| 3,041,897 | 7/1962 | Linsker | 408/130 |
| 3,141,509 | 7/1964 | Bent | 408/130 X |
| 3,220,031 | 11/1965 | Supernor | 10/129 |
| 3,266,580 | 8/1966 | Clapp et al. | 408/130 X |
| 3,286,555 | 11/1966 | Klancnik | 77/32.3 |
| 3,301,333 | 1/1967 | Linsker | 408/130 X |
| 3,318,391 | 5/1967 | Linsker | 408/130 X |
| 3,357,275 | 12/1967 | Green, Jr. et al. | 74/606 |
| 3,398,609 | 8/1968 | Schott | 77/7 |
| 3,603,206 | 9/1971 | Quackenbush | 91/61 |
| 3,609,054 | 9/1971 | Nyman | 408/17 |
| 3,680,970 | 8/1972 | Deschner | 408/17 |
| 3,773,117 | 11/1973 | Dussel | 173/4 |
| 3,874,808 | 4/1975 | Zaccardelli et al. | 408/1 |
| 3,927,583 | 12/1975 | Parsons et al. | 82/2.5 |
| 3,955,629 | 5/1976 | Turner | 173/19 |
| 4,087,137 | 5/1978 | Voitas | 308/237 R |
| 4,123,187 | 10/1978 | Turner | 408/17 |

(List continued on next page.)

FOREIGN PATENT DOCUMENTS 2049469  5/1971 Germany .
1456679 12/1973 United Kingdom .
WO8904229  5/1989 WIPO .

OTHER PUBLICATIONS

Excerpt from The ARO Equipment Corporation Manual, p. 1, Section 3, entitled, "Automatic Drilling at (List continued on next page.)

Primary Examiner—Z. R. Bilinsky
Attorney, Agent, or Firm—Conley, Rose & Tayon

[57] ABSTRACT

An airfeed peck drill includes a substantially cylindrical drill quill contained within a cylinder in a housing. On the rear end of the drill quill is located an offset piston, the offset piston provides force for the entry and exit of the drill quill into or from a workpiece. On the front end of the drill quill is a reaction bracket which is attached to a motion transfer arm. On the rear end of the motion transfer arm is an engagement arm which is constructed and arranged to engage a piston rod which extends from a damping cylinder.

14 Claims, 2 Drawing Sheets

U.S. PATENT DOCUMENTS

| | | | |
|---|---|---|---|
| 4,123,188 | 10/1978 | Deremo et al. | 408/17 |
| 4,152,091 | 5/1979 | Kucera | 408/146 |
| 4,157,231 | 6/1979 | Phillips | 408/1 R |
| 4,169,637 | 10/1979 | Voitas | 308/241 |
| 4,233,885 | 11/1980 | Deschner | 91/410 |
| 4,241,483 | 12/1980 | Voitas | 29/149.5 |
| 4,257,314 | 3/1981 | Deschner | 92/5 R |
| 4,257,499 | 3/1981 | Deschner | 188/287 |
| 4,269,550 | 5/1981 | DiGiulio | 408/241 B |
| 4,362,444 | 12/1982 | Watkins | 408/17 |
| 4,452,552 | 6/1984 | Watkins | 408/14 |
| 4,507,026 | 3/1985 | Lundq | 408/72 |
| 4,538,943 | 9/1985 | Clifton et al. | 408/14 |
| 4,588,334 | 5/1986 | Khurana | 408/61 |
| 4,594,030 | 6/1986 | Weigel, Jr. | 408/10 |
| 4,606,001 | 8/1986 | Rieben et al. | 364/167 |
| 4,674,927 | 6/1987 | Khurana | 408/56 |
| 4,752,161 | 6/1988 | Hill | 408/67 |
| 4,764,060 | 8/1988 | Khurana | 408/14 |
| 4,867,617 | 9/1989 | Maass et al. | 408/17 |
| 4,961,675 | 10/1990 | Stewart | 408/1 R |
| 5,001,826 | 3/1991 | Stewart et al. | 29/464 |

OTHER PUBLICATIONS

Lowest Cost with ARO Self-Feed Air Powered Drilling Units".

ARO Brochure entitled, "Quality, One-Pass Drilling for the Aerospace Industry".

Keller Tool Company brochure entitled, "Keller Series 92A 'AIRFEEDRILLS' The Most Completely Automatic and Self Contained Drilling Unit on the Market Today," Section 92, p. 201, Feb. 15, 1954.

Gardner-Denver Company brochure entitled, "Drill Bushing Tips for Fast, Accurate Mounting of Airfeedrills, Tru-Thread Tappers, True-Feed Drills, K-Matics".

Gardner-Denver Company, Keller Tool Division, "Operating Guide and Service Manual for 92A Series Keller 'AIRFEEDRILL' with Illustrated Parts List and Spare Parts List," Section 92, Service Manual No. 5, Jun. 15, 1956.

AIR FEED PECK DRIVE CONFIGURATION

This is a continuation of copending application(s) Ser. No. 07/873,639 filed on Apr. 23, 1992, which is a continuation of Ser. No. 07/114,954, filed Oct. 30, 1987, both abandoned.

BACKGROUND OF THE INVENTION

The present invention relates to airfeed drills; more particularly, the present invention relates to airfeed peck drills.

Airfeed peck drills have found their greatest utilization in the aerospace industry. This is because airfeed peck drills have the ability to drill accurate holes with a fine surface finish. Heretofore it was thought that airfeed peck drills were best used when drilling deep holes in thick material (depth to diameter ratios or 7:1 or greater).

A typical design for an airfeed peck drill is shown in U.S. Pat. No. 4,123,188. The extended length of the airfeed peck drill taught in the '188 patent embodies what was thought to be the necessary technology to make an airfeed peck drill operate. Specifically, it was thought that the drill quill containing the air motor and reduction gearing must be moved by an air cylinder attached to the back end of the drill quill. To control drill travel a follower arm was mounted to the back of the cylinder. The follower arm was used to engage a damping cylinder. This damping cylinder then controlled the feed rate of the drill quill towards the workpiece.

Because of the movement of the rotating drill in and out of the hole being formed in the workpiece, it is essential that the travel of the rotating drill be closely confined to exactly the same path or else any slight wobble or displacement of the rotating drill would cause the hole to be formed out of round or to be formed in a skewed manner. Consequently, any forces or extensions from the drill quill were positioned so as to not cause any deflection of the drill quill as it neared the mouth of the hole being drilled. Additionally it was felt that all forces exerted in a direction parallel to the drill quill should be as co-linear to the central axis of the drill quill as possible. Such constraints led to the long, lengthly design of airfeed peck drills. While satisfactory in their performance, it was found that such long airfeed peck drills were limited in their application due to their excessive length. When these long airfeed peck drills were mounted to a fixture for the drilling of a hole a moment arm was created by the drill itself. This moment arm coupled with the weight of the unit would then cause improperly drilled holes, particularly in smaller or thinner workpieces, due to fixture deflection.

There is therefore a need in the art to provide an airfeed peck drill which does not have the long length of prior art drills such that airfeed peck drills may be used without the need for heavy massive fixturing.

SUMMARY OF THE INVENTION

A shortened airfeed peck drill includes a motor and reduction gearing in a drill quill which is contained within a cylindrical housing. The distal end of the drill quill includes a piston so that the drill quill may be reciprocated within the housing. A reaction bracket is attached to the front end of the drill quill. Following rearward and external to the housing is a motion transfer arm. The motion transfer arm is connected to the reaction bracket. At the rear end of the motion transfer arm is an engagement arm for contact with the damping cylinder which controls the rate of entry of the drill into the workpiece. Additionally, the airfeed peck drill of the present invention may include a device which mechanically fixes the position of the piston rod which extends from the damping cylinder at the end of each feed cycle and means to control the duration or time of each peck cycle.

BRIEF DESCRIPTION OF THE DRAWINGS

A better understanding of the airfeed peck drill assembly of the present invention may be had by reference to the drawings wherein.

BRIEF DESCRIPTION OF THE EMBODIMENTS

Figure 1:
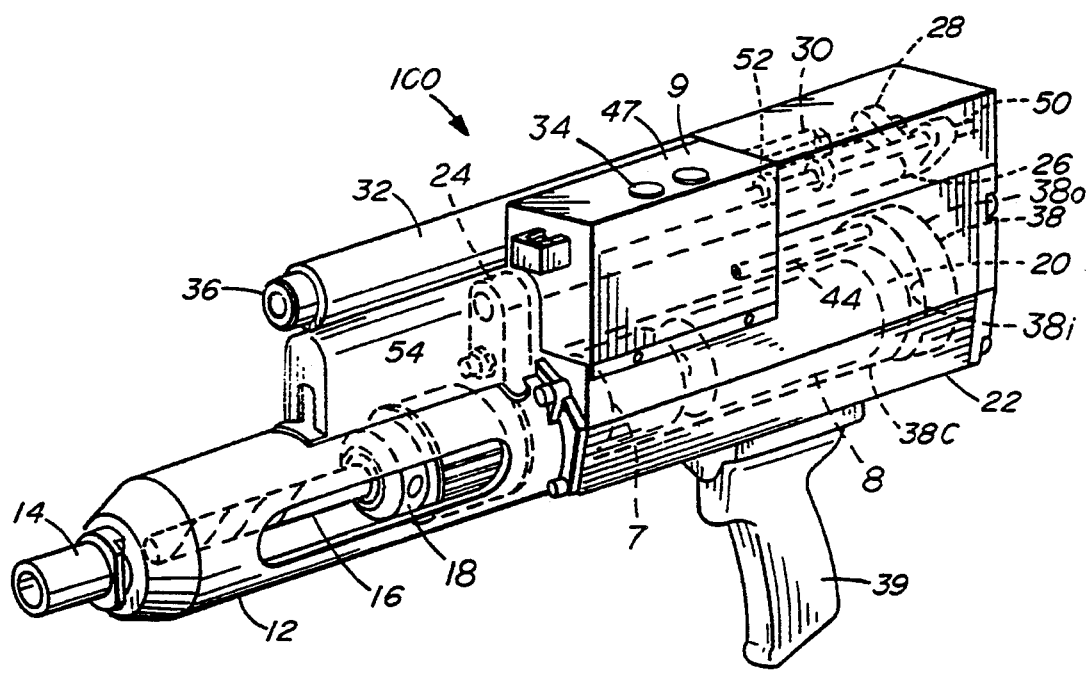
FIG. 1 is a perspective view, partially in phantom, illustrating internal components of an airfeed peck drill.
Figure 2:
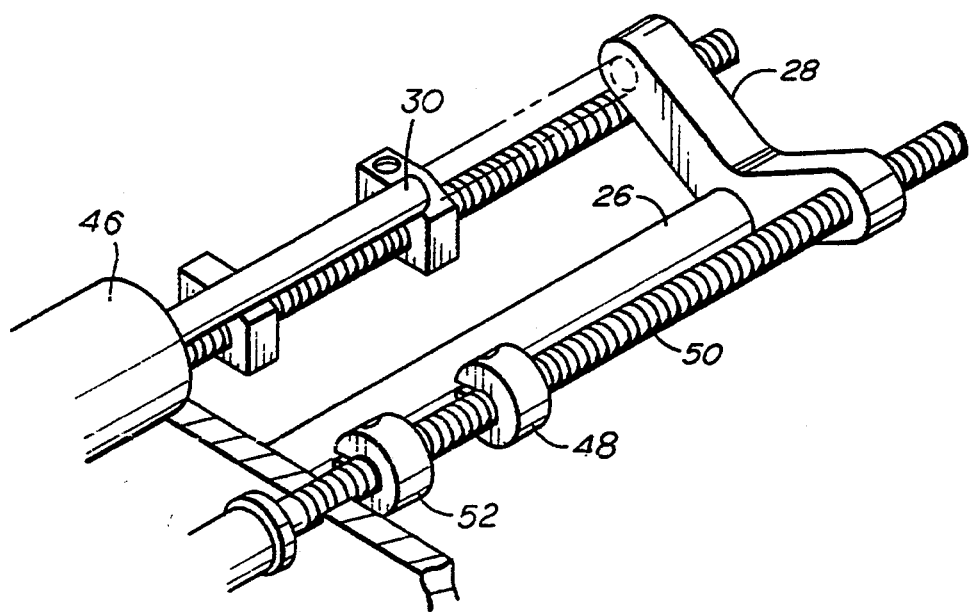
FIG. 2 is a prospective view of the motion transfer arm of the airfeed peck drill shown in FIG. 1.

As may be seen in FIGS. 1 and 2, airfeed peck drill 100 consists of several parts. On the front of the airfeed peck drill is a nose piece 12. A drill bushing 14 is attached to nose piece 12 to mount airfeed peck drill 100 to a fixture (not shown). The fixture is attached to a workpiece. Travelling through nose piece 12 is rotary drill 16 and chuck 18. Rotary drill 16 and chuck 18 are driven rotatably by an air motor 8 and gear arrangement 7, which are enclosed within drill quill 20. Drill quill 20 fits within a cylinder formed in housing 22. Heretofore it was thought necessary to avoid any contact with front cantilevered portion of drill quill 20. It was felt that contact with the front of drill quill 20 would lead to problems such as inaccuracy and surface roughness on the inside of the hole being drilled. Specifically, forces exerted near the front of drill quill 20 were thought to deflect drill quill 20. The continued insertion and extraction of the rotating drill from the hole exaggerated any deflection of the drill quill resulting in a lack of accuracy in the drilled hole. Therefore, it was deemed necessary to avoid any forces on the front of the drill quill to avoid any deflection of the drill as it entered the hole.

The airfeed peck drill of the present invention 100 includes a reaction bracket 24 which is attached to the front end of drill quill 20. The attachment of reaction bracket 24 to the front end of drill quill 20 will not cause the drill bit 16 to waiver or be deflected as it enters or exits the hole being drilled as the drill bit is supported by drill bushing 14. Additionally, it has been found that drill quill 20 may be offset with respect to piston 38 without causing drill quill 20 to waiver or deflect. This offset allows for the placement of a motor air feed tube 44 above quill 20 and within the retract side of the cylinder within housing 22. Feed tube 44 is rigidly attached to offset thrust piston 38 so that air may be fed to the motor within drill quill 20 while drill quill 20 reciprocates. Feed tube 44 also assures proper orientation of piston 38. Opposite feed tube 44 is back set adjusting screw 54. Screw 54 is positioned so that it will limit the range of travel of quill assembly 20. The adjustment of a screw 54 allows for exclusion of any segment of the return stroke of drill quill 20. Accordingly, the retracted position of quill assembly 20 may be adjusted for various drill 16 lengths maintaining rotation from the time quill 20 advance begins until it is fully retracted. This is accomplished because screw 54 interacts with the valve (not shown) which supplies air to the drive motor. When the rotating drill is moved toward the workpiece, screw 54 is out of contact with the valve which supplies air to the motor. The motor operates because this valve is of a normally open configuration. A further advantage of the adjustment of screw 54 is that the end of the drill bit 16 may be positioned even with the end of drill bushing 14 or at any other desired location irrespective of the length of drill 16 or chuck 18. This eliminates unnecessary drill travel time.

Attached to reaction bracket 24 and running parallel to housing 22 is motion transfer arm 26. Motion transfer arm 26 moves both forward and backward as reaction bracket 24 follows the position of drill quill 20.

Attached to the end of motion transfer arm 26 is engagement arm 28. Engagement arm 28 extends away from motion transfer arm 26 and contacts piston rod 30 which extends from damping cylinder 32.

OPERATION

Figure 3:
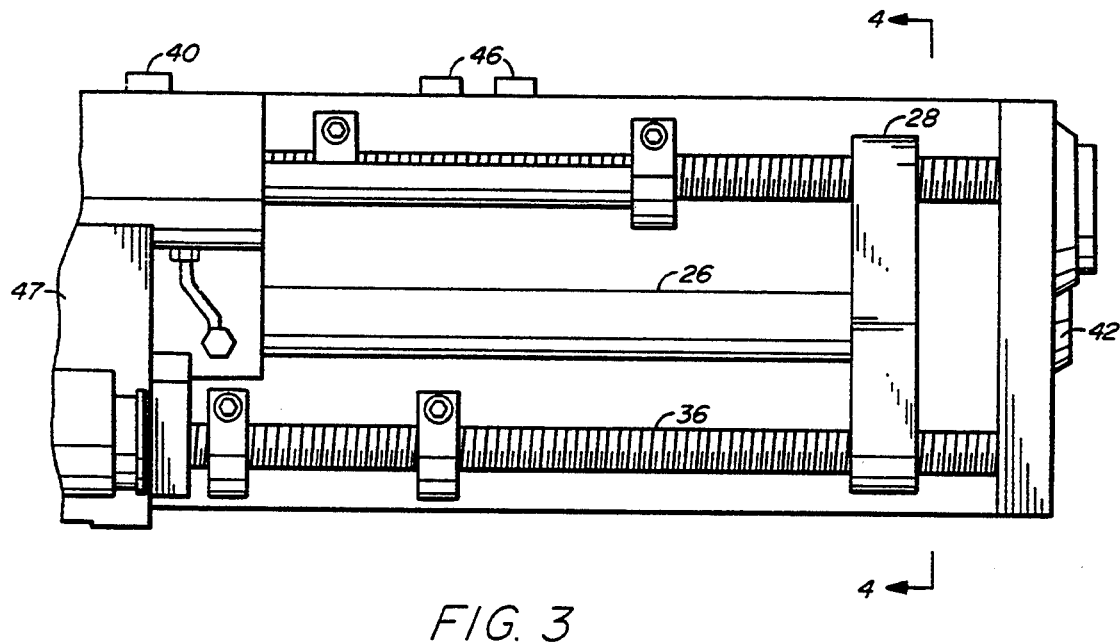
FIG. 3 is a top view partially in phantom showing the motion transfer arm of the airfeed peck drill shown in FIG. 1.

Because of the small and compact size of the airfeed peck drill 100 of the present invention, it is easily carried to the work site. Optionally pistol grip handle 39 may be attached to housing 22 for additional ease in handling and using drill 100. Compressed air may be supplied to the tool at one of two locations. Specifically, compressed air may be supplied through air inlet 40 located on the side of the drill 100 as shown in FIG. 3 or through air inlet 42 which is located on the rear of drill 100. The flow of compressed air passes through passageways in housing 22 and through feed tube 44 on route to the air motor 8 (not shown) contained in drill quill 20. Compressed air exits drill 100 through exit ports 46 shown in FIG. 3.

After airfeed peck drill 100 is mounted to a fixture by bushing 14 or any other suitable means, activation switch 34 is pushed and the peck drilling cycles begin. Rotating drill 16 is moved into the workpiece. The time of contact of rotating drill 16 with the workpiece is controlled by air logic means 9 contained on the side of the airfeed peck drill. Such air logic means 9 are well known in the art and have been typically used on a variety of air tools and pneumatic power equipment.

Figure 4:
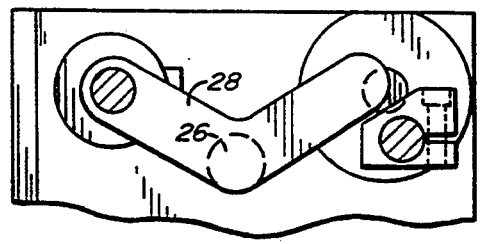
FIG. 4 is a section view at plane 4—4 of the engagement arm of the airfeed peck drill shown in FIGS. 1 and 3.

Controlling the rate of feed of airfeed peck drill 100 is damping cylinder 32 which is mounted on the top of airfeed peck drill 100. Extending rearward from damping cylinder 32 is piston rod 30 which exerts a continuing counter force on engagement arm 28. Damping cylinder 32 houses a piston (not shown). This piston is constructed so that a controlled flow of hydraulic fluid is allowed around the piston. In more sophisticated damping cylinders, a knob 36 on the front allows the counterforce applied by the piston to be adjusted. This changes the drill feed rate. Specifically, a very low counterforce increases the feed rate of airfeed peck drill 100 so that drill 100 will move farther into the workpiece before the timing circuit takes over and causes the drill to back out of the hole. A larger counter force will cause airfeed peck drill 100 to move a lesser distance into the workpiece before the timing circuit takes over and causes the airfeed drill to move out of the workpiece. It will be noted that when the airfeed drill moves back out of the workpiece, engagement arm 28 moves away from the end of piston rod 30 which extends from damping cylinder 32. That is the air supplied to piston 38 at the end of housing 22 causes drill quill 20 to retract until adjustment screw 58 stops against valve (not shown). The air logic circuit then causes the air to be applied to the rear of piston 38 and drill quill 20 returns toward the workpiece in a rapid return fashion. In FIGS. 3 and 4 it may be seen that piston 38 is offset from the center axis of drill quill 20 and that the area on the outboard side 38o of piston 38 is greater than the area on the inboard side 38i. Rapid return is checked by the engagement of engagement arm 28 with piston rod 30. The timing of the peck cycle is controlled by the air logic means 9 and as previously mentioned, the rate of travel of drill quill 20 is controlled by the amount of counterforce provided by damping cylinder 32.

During the peck drilling cycle, piston rod 30 is not allowed to return to the rearmost position with engagement arm 28. Capturing the position of piston rod 30 is a setback control 47. Setback control 47 restricts the amount of return of control rod 30 and consequently allows rotating drill 16 to rapid advance to within a predetermined distance from the bottom of the hole. As engagement arm 28 moves further and further toward the workpiece, it eventually contacts stop 48 which moves threaded rod 50 forward. At the end of threaded rod 50 is a valve 11 which signals completion of the drill operation. Also located on threaded rod 50 is stop 52 which provides a positive stop for accurate depth control.

The foregoing embodiments are intended to illustrate the present invention and not to limit in spirit or scope.

What is claimed is:

1. An airfeed peck drill comprising:
   a substantially cylindrical drill quill containing a drive motor and power transmission section;
   a piston member attached to the rear end of said substantially cylindrical drill quill;
   a housing containing a substantially cylindrical section constructed and arranged for engagement with said piston member;
   a reaction bracket attached to the front end of said substantially cylindrical drill quill;
   a motion transfer arm connected to said reaction bracket, said motion transfer arm extending rearwardly along said housing substantially parallel to said substantially cylindrical section;
   an engagement arm extending from said motion transfer arm;
   a damping cylinder having a piston rod extending therefrom located substantially parallel to said substantially cylindrical section so that said engagement arm may mechanically engage said piston rod.

2. The airfeed peck drill as defined in claim 1 wherein said piston member provides force for entry and exit of the drill into a workpiece.

3. The airfeed peck drill as defined in claim 2 wherein the surface area of said piston which provides for entry of the drill into the workpiece is larger than the surface area which provides for exit of the drill from the workpiece.

4. The airfeed peck drill as defined in claim 3 wherein the drill quill is offset with respect to the piston member.

5. The airfeed peck drill as defined in claim 4 wherein an airfeed tube is mounted to said piston member for supplying air to said air motor.

6. The airfeed peck drill as defined in claim 1 wherein an air inlet port is located on the rear of the housing.

7. The airfeed peck drill as defined in claim 1 wherein an air inlet port is located on the side of the housing.

8. An airfeed peck drill having a pneumatic motor for rotating a drill into a workpiece comprising:
 a housing having a cylinder;
 a drill quill containing the pneumatic motor reciprocally mounted within said cylinder;
 a piston affixed in offset relation to one end of said drill quill; and
 an air tube mounted on said piston for supplying air to the pneumatic motor, said air tube extending adjacent to and parallel with said drill quill.

9. The airfeed peck drill of claim 8 wherein said drill quill has a retracted position within said cylinder away from the workpiece and an extended position within said cylinder upon the drill travelling a predetermined distance toward the workpiece.

10. The airfeed peck drill of claim 9 further including means for adjusting said drill quill in said retracted position.

11. The airfeed peck drill of claim 8 wherein said air tube engages a side of said housing to orient said piston within said cylinder.

12. The airfeed peck drill of claim 8 wherein said piston includes a feed side and a retract side, said retract side having a smaller surface area than said feed side whereby said piston and drill quill make a rapid return toward the workpiece.

13. The airfeed peck drill of claim 8 further including a bracket mounted on another end of said drill quill and supporting a motion transfer arm extending parallel to said drill quill, said motion transfer arm adapted for engaging means for controlling the feed rate of the drill.

14. The airfeed peck drill of claim 13 wherein said means includes a dampening cylinder having a piston rod adapted to engage an engagement arm on said motion transfer arm.

* * * * *